United States Patent Office 3,543,045
Patented Nov. 24, 1970

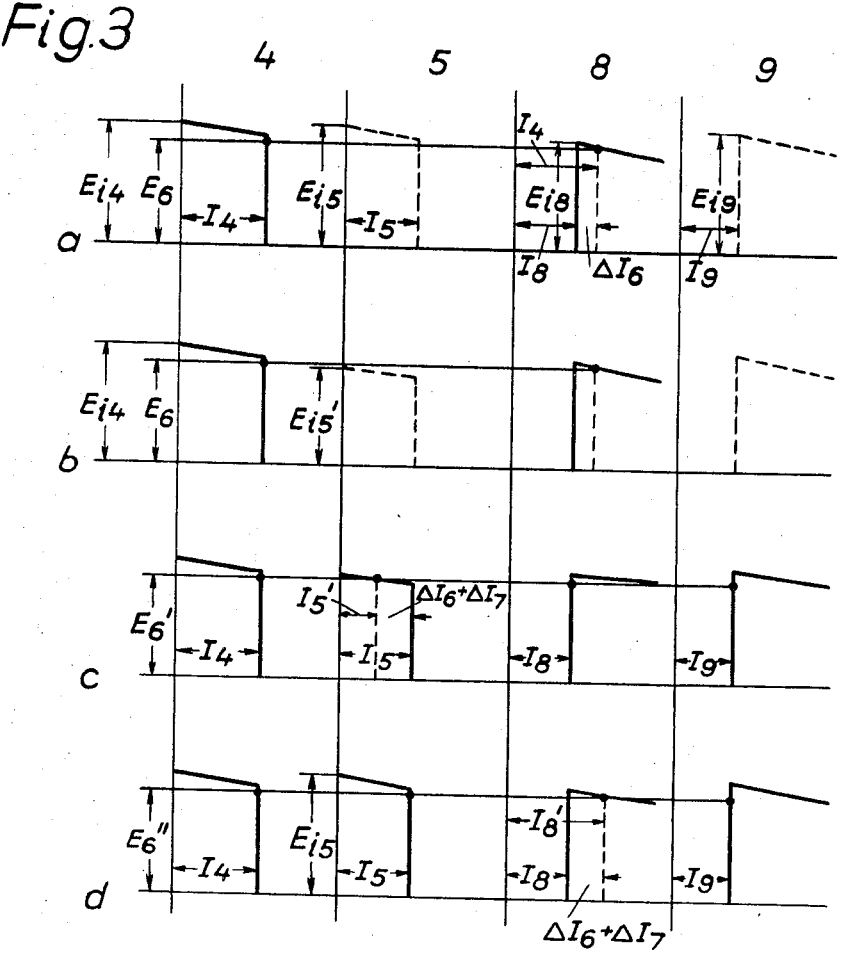
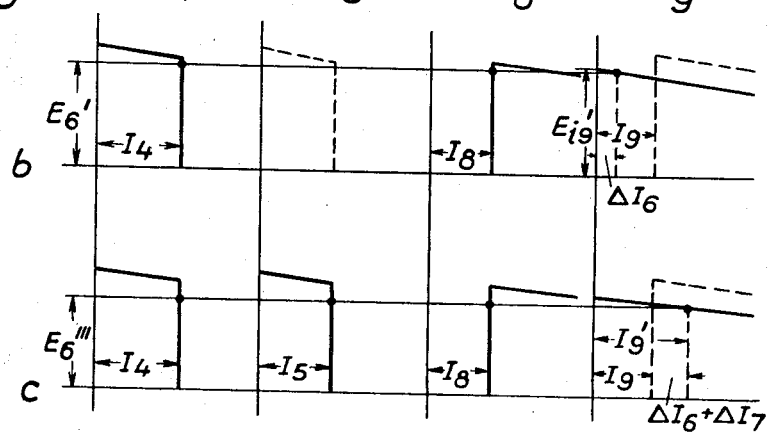

3,543,045
METHOD AND APPARATUS FOR CONNECTING AND DISCONNECTING CONVERTER STATION BETWEEN TRANSMISSION LINES
Gustav Bertil Hammarlund, Gustav Heine Martensson, and Erich Uhlmann, Ludvika, Sweden, assignors to Allmanna Svenska Elektriska Aktiebolaget, Vasteras, Sweden
Continuation-in-part of application Ser. No. 498,507, Oct. 20, 1965. This application July 29, 1968, Ser. No. 767,872
Claims priority, application Sweden, Jan. 9, 1965, 263/65
Int. Cl. H02j 3/36
U.S. Cl. 307—82                                                   7 Claims

ABSTRACT OF THE DISCLOSURE

An HVDC transmission plant comprises two separate transmission lines, each line connecting at least two converter stations. Each of said stations comprises switching means for alternative connection of the station to one or the other of said two lines. Each line is provided with fault indicating means connected to said switching means and to control means for said stations. In case of a fault on a line, the fault indicating means of said line influence the converter stations of the line and their switching means in such a way that said stations are first blocked, then disconnected from their line and connected to the other line and then deblocked one at a time, the first deblocked station having its ideal no-load voltage decreased to a value lower than the ideal no-load voltage of any of the stations of the fault-free line, and further, if said first deblocked station is an inverter station, its current setting is reduced to a value lower than the current margin of the fault-free line.

PRIOR APPLICATIONS

This application is a continuation in part of our prior application S.N. 498,507, filed Oct. 20, 1965.

BACKGROUND OF THE INVENTION (1) Field of the invention

The present invention relates to a power transmission plant for high voltage direct current comprising two separate transmission lines with converter stations connected to them, each station being provided with control means for current and voltage and connected to an A.C. network. Further, it is assumed that switching means are arranged for alternative connection of the converter stations to each one of the transmission lines and that each line is provided with indication devices for indication of the line faults.

(2) The prior art

If a rectifier power transmission comprises at least four stations, it can sometimes be desirable to divide such a transmission into two separate transmission systems which normally operate independently each on its own line. If the relative geographical locations of these two transmissions allow it, it can be desirable that, in the event of faults in one line, all the stations are connected together on the remaining fault-free line and in such a way that a line reserve is obtained to such an extent as the loading conditions will allow, that is, as long as the total loading of the stations does not rise above the maximum permissible loading of the line.

It is known to have a number of converter stations co-operating in parallel on the same line and the operating principles for such a system have been given in application S.N. 340,352, filed Jan. 27, 1964. In said application it has also been shown how the stations can be connected to and disconnected from the line in different ways without disturbing to any great extent the operation of the remaining stations and the transmission line. In said patent application, it has been stated among other things that attention must be paid to the preset currents of the different staions and maximum EMF or more correct ideal no-load voltage, that is, the maximum voltage which can be achieved in thē station at the lower limit of the control angle or the margin of commutation respectively depending on whether the station operates as a rectifier or an inverter. In the case in question, there is however usually a demand for a quick action with reference to the A.C. network connected to the stations which are switched over. In order to achieve such a quick action, that is above all, a quick switching over of the converter stations from a faulty line to a fault-free line, as few steps as possible are required during the switching and with regard to the demand of undisturbed operation of the fault-free line and its converter stations.

SUMMARY OF THE INVENTION

The present invention demonstrates a way in which converter stations quickly and safely can be switched over from one transmission line to another and a power transmission plant according to the invention is characterized in that the fault-indicating devices of the two lines are connected to the switching devices and control means of the corresponding converter stations in such a way that upon a fault in one line the stations connected to this line are first blocked, then disconnected from the line, after which they are connected to the fault-free line and deblocked one at a time. At the same time the control means of the station which is first deblocked is adjusted before the deblocking in such a way that the ideal no-load voltage of this station is reduced to a value which is lower than the ideal no-load voltage in any of the stations of the fault-free line and, if the station which is blocked first is an inverter station, its current demand is reduced to a low value. Said current demand is suitably reduced to zero but in itself it is sufficient if the current demand is reduced to a value which is lower than the so-called current margin in the fault-free system.

In order to secure stable operation, the ideal no-load voltage of the first deblocked station is suitably reduced to a value which is lower than the voltage of the fault-free line. When the first station has been deblocked, the next station can be deblocked without any changes in its control.

If the first deblocked converter station is a rectifier station, it is seen that, because of its low ideal no-load voltage, it is not possible for this station to deliver any current to the system, so the current distribution in the system is maintained corresponding to the currents preset in the original stations of the fault-free line. Then, when an inverter station is connected this station will require current so that all the stations will change their control angles so that their voltage is decreased to such a degree that the previously deblocked rectifier station delivers current corresponding to the current requirement of the recently connected inverter station.

If the first deblocked station is an inverter station, this station because of its zero current demand will increase its voltage in order to remain current-free. Since however the ideal no-load voltage of the station is below the voltage of the fault-free line, the station will receive the current which is equal to the current margin of the original system. Owing to this it is possible before the deblocking of the following rectifier station to observe whether the first deblocked inverter station really is operating. The rectifier station which is then blocked will apply a further current to the first deblocked inverter station equal to the current demand in said rectifier station.

In the previously mentioned patent application different ways of connecting converter stations to a line have been given, but it is evident from the above that according to the present invention it is only necessary to influence the control of the first deblocked station, while according to previously known connecting principles it was necessary to influence the control in many stations. When all stations have come into operation, the current and voltage demand of the first deblocked station should be changed to the original values, but either this or the other switchings will cause greater changes in the original transmission system. This latter adjustment does not demand rapid operation, since the transmission effect has substantially been restored with all stations being deblocked. Finally it can be said that the most important consequence of the connection of all the converter stations on one line is the increased voltage drop in the transmission line due to the increased transmission current.

BRIEF DESCRIPTION OF THE DRAWINGS

For the rest the invention will be described in more detail with reference to the accompanying drawing, where FIG. 1 as a block diagram shows a transmission system according to the invention, while FIGS. 3 and 4 show current and voltage conditions in the plant during a reconnection action.

DESCRIPTION OF THE PREFERRED EMBODIMENTS

Figure 1:
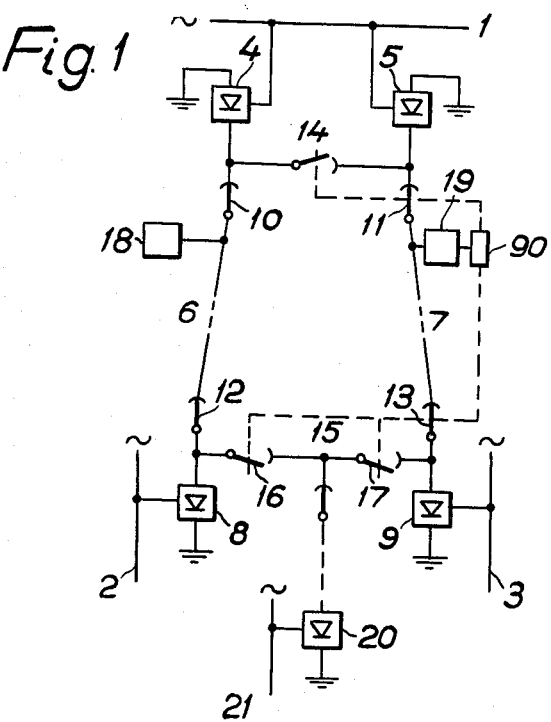

FIG. 1 shows an A.C. network 1 which feeds, through a power transmission system according to the invention, two separate A.C. networks 2 and 3. The transmission system comprises two rectifier stations 4 and 5, which are each connected over transmission lines 6 and 7 to inverter stations 8 and 9. At the ends of the two transmission lines there are connection devices 10–13, for example in the form of power isolating switches which are the most usual type of connection devices for high voltage direct current. In the case shown it is assumed that the stations 4 and 5 are placed in the vicinity of each other, while the stations 8 and 9 are placed at a certain distance from each other, but however not farther than a reasonable distance for arranging a connection 15 between these stations. At the ends of this connection, connection devices 16 and 17 are arranged and a similar device 14 is connected between the stations 4 and 5. These connection devices are suitably of the same type as the connection devices 10–13. Further, it is assumed that the D.C. system is made as a uni-polar system, so that the converter stations are arranged in parallel between said system and earth. In each transmission line a fault indication device 18, 19 respectively is also arranged for indication of earth faults, line breaks and similar faults.

During normal operation the devices 10–13 are closed, while the devices 14, 16 and 17 are open so that the transmission systems 4, 6, 8 and 5, 7, 9 operate independently. Upon faults in one line, for example line 7, the conventional precautions in the form of disconnection and reconnection attempts of the stations will be made on this line. If the reconnection attempts are not successful, which thus means that a permanent fault has occurred on the line, the indication device 19 will give an order, for instance through a main control device 90, to the control means in the stations 5 and 9 for the blocking of these stations. When this has been done, the devices 11 and 13 are opened and, when this too has been done, the devices 14, 16 and 17 will be closed, so that the stations 5 and 9 are connected to the transmission line 6. Such switching steps are purely conventional and are suitably carried out in such a way that when one stage is carried out the next stage is started.

The stations 5 and 9 are still blocked and it should be predetermined which station is to be deblocked first. Such a deblocking program can suitably be prepared in the main control device 90. If, for example, it is the rectifier station 5 which is to be deblocked first, the ideal no-load voltage of this station must first be reduced to a value which lies below the voltage in the transmission line 6. This voltage can be measured directly in the D.C. line from the station. Because of its low no-load voltage, the converter station 5 is however not able to deliver any current to the transmission line 6. When the inverter station 9 is then deblocked, which may be done without any changes in the current or voltage order of the station, this station will demand a current which will be delivered by the rectifier station 5.

Figure 2:
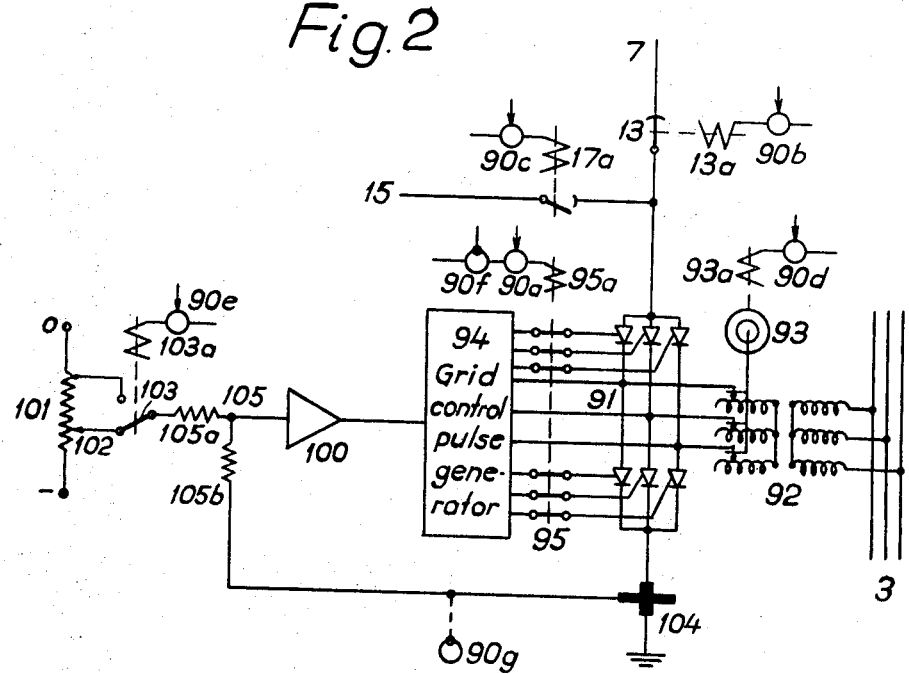
FIG. 2 shows one of the converter stations in FIG. 1.
Figure 2A:
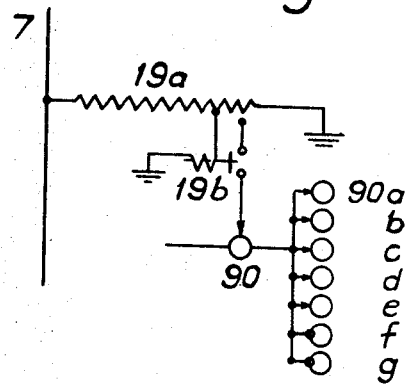
FIG. 2a shows in detail the fault indicating means and the main control device.

If station 9 is to be deblocked as the first station, the preset current of this must also be reduced as this station operates as an inverter. The procedure is more closely described with reference to FIG. 2, showing station 9 in more detail. The station comprises a rectifier group 91 connected to the A.C. network 3 over the converter transformer 92. This is provided with a tap selector 93 on its rectifier side for adjusting the ideal no-load voltage of the station. The rectifier group 91 is controlled from a control pulse means 94 connected to the rectifier group over a switch 95. Such a control pulse means is shown in Adamson & Hingorani: High Voltage Direct Current Power Transmission, Garraway Ltd., London 1960, Fig. 4.6, on page 55. The control means is controlled from a current regulator 100 provided with adjusting means comprising a potentiometer 101 with a movable terminal 102 connected to the current regulator over a two-way contact 103. Further, the current regulator is connected to a measuring transducer 104 for measuring the actual direct current in the station 9. The other reference numbers are the same as in FIG. 1.

In case of a permanent fault in the line 7, the fault indicating means 19 gives a signal to the main control means 90 which blocks the station by opening the switch 95 so that the control pulses to the rectifier connection 91 are disconnected. Then the isolator 13 is opened and the isolator 17 is closed. The ideal no-load voltage of the station is reduced by means of the tap selector 93 and, as the station operates as an inverter, its preset current must be reduced to a low value which is accomplished by switching over the contact 103 to its upper position so that the voltage from the potentiometer 101 is decreased.

Now the station is ready for deblocking by closing the switch 95 so that the rectifier group 91 will get back its control pulses. The station will then have a current equal to the current margin preset in the line 6.

The process is explained more clearly by FIG. 3, where current and voltage adjustments in the different stations are shown during different stages of the connection. The knee curves shown in FIG. 3 give adjusted current and maximum voltage in the different stations. In FIG. 3a is shown how the stations 4 and 8 connected to the fault-free line 6 adjust themselves in relation to each other. The station 4 has the largest ideal no-load voltage $E_{i4}$, so that this station through its delay angle control adjusts its voltage in relation to the station 8 to such a value that the station 4 delivers the current $I_4$. This current exceeds the current $I_8$ of the station 8, by a value $\Delta I_6$, the so-called current margin. As is already known from the field of converter technique, the station 8 will receive a current determined by the station 4. On the other hand, it is the station 8 which determines the transmission voltage.

The stations 5 and 9 are connected to the line 6 but are still blocked and will therefore not carry any current. The current values existing in their current regulators are denoted by $I_5$ and $I_9$. In FIG. 3 the ideal no-load voltage for the station 5 has been reduced to a value $E_{i5a}$ which is lower than the voltage $E_6$ in the transmission line 6.

The station has been deblocked but has no possibility of furnishing current, since its maximum voltage is below the actual line voltage $E_6$. In FIG. 3 the inverter station 9 has been deblocked. In the control means of this station the original current adjustment 9 remains, so that the station 9 decreases its voltage until the desired current in the station is obtained. This station will therefore first take up the current margin in the line 6, $\Delta I_6$, that is, the difference between the existing currents $I_4$ and $I_8$ in the stations 4 and 8, so that the current in the station 8 decreases to the value $I_8$. Full current is reached in the station 9 when its voltage has become so small that that station 5 is able to deliver the desired remaining current $I_{5'}$. This remaining current will fall below the current $I_5$ by the summary of the current margins in the lines 6 and 7, that is, $\Delta I_6 + \Delta I_7$. At the same time the stations 4 and 8 will reduce their voltage to the value $E_{6'}$, given by the station 5, in order to maintain their desired current value. In order to restore the desired transmission voltage $E_{6'}$, the ideal no-load voltage of the station 5 is finally increased to its original value $E_{i5}$ so that the station 8 can again become voltage determining. The station 8 will then take up said total of current margins, so that the line voltage $E_{6''}$ after reconnection will become a little lower than the original $E_6$ as shown in FIG. 3d. As previously stated, this latter adjustment can be made relatively slowly.

The reduction of the ideal no-load voltage in a converter station can be carried out in different ways. For example, the voltage on the converter transformer of the station can be regulated by means of a tap selector, which however is a relatively slow process. If the station comprises several constituent converters deblocking can be carried out in such a way that all constituent converters except one are deblocked. This will however in most cases give an inconveniently large reduction of the no-load voltage of the station, as it involves a correspondingly large drop of the transmission voltage and thereby of the transmitted power between the stations 4 and 8, when the inverter station 9 is deblocked. The third and in this case more convenient and quicker reduction in the no-load voltage of the station 5 is reached by introducing a temporary limitation of the delay angle for the rectifiers of the station, that is, an increased minimum value for the delay angle is temporarily introduced. Such a delay angle limitation can be introduced very quickly and at the same time can be adapted so that it is not greater than necessary for the safe reduction of the no-load voltage of the station 5 to a value below the line voltage.

As mentioned previously, it is sufficient to reduce the no-load voltage $E_{i5}$ to a value lower than the no-load voltage $E_{i8}$ in the station 8. The safety margin for undisturbed operation in the original transmission will however thereby be less.

If the inverter station 9 is first deblocked, the action will be as given in FIG. 4. The output position hereby becomes the same as given in FIG. 3a for which reason FIG. 4a is omitted. In FIG. 4b the current adjustment for the station 9 has been changed to zero, and the no-load voltage has been reduced to $E_{i9'}$, after which the station has been deblocked. Hereby the station 9 will take up a current which is equal to the margin current $\Delta I_6$ in the original line. This gives the advantage that, before the deblocking of the station 5, it is possible to ensure that the station 9 is in operation. This safeguard can be utilized in such a way that the deblocking of the station 5 cannot be carried out before a signal has been delivered from the station 9 as to whether this station is current carrying. Such a safeguard cannot be reached according to the method given in FIG. 3. In both cases a missed function in the first deblocked station means that the current distribution in the system will be unbalanced when the next station is deblocked, which in critical cases may involve a total break in operation in the complete transmission. For this reason it is usual to prefer that an inverter station must be first deblocked. In FIG. 4c that station 5 has been deblocked, so that this station, because of its current adjustment, will give a further current to the station 9, so that the line voltage further falls to the value $E_{6''}$. When the no-load voltage of the station 9 has been changed to its original value $E_{i9}$, the relation between the different stations will be as given in FIG. 3d.

From FIG. 3d it is seen that the current occurring in the station with the lowest ideal no-load voltage will deviate from the desired current by an amount corresponding to the sum of the current margins $\Delta I_6$ and $\Delta I_7$ for the two lines 6 and 7, i.e. that in the case in question the station 8 has increased its current from the original value by $\Delta I_7$, while station 9 has reduced its current by the same amount. If this cannot be allowed, a final adjustment of the current adjustments of the stations must be made when the switching process has been carried out. This final current adjustment will however, like the voltage adjustment from step c to d according to FIGS. 3 and 4, not give any disturbances in the function of the system. It is seen that in both cases reconnection according to the invention only comprises the absolutely necessary steps, namely the desired switching of the different isolating switches and adjustment of voltage, and possibly current, in the first deblocked station. After this, subsequent stations will be deblocked without previous changes of current and voltage adjustment.

When the fault in the disconnected line has been repaired, this line without anything further is reconnected by closing the isolating switches 11 and 13. The current distribution in the transmission will then depend on the ratio between the voltages of the different stations and the resistances in the different parts of the transmission system, so that current can occur in the cross connections between the two lines 5 and 7, which currents are broken at the opening of the isolating switches 14, 16 and 17.

In FIG. 1 the rectifier stations 4 and 5 are connected to one and the same A.C. network. This is however not important for the idea of the invention, which can be utilized for connection of any kind of D.C. transmissions where these are so placed that cross connections are economical. Further, the number of converter stations connected to the two lines is not important for the application of the invention.

In FIG. 1, for example, it has been shown how a fifth station 20 with accompanying A.C. network 21 can be connected to the cross connection 15 which thereby can be connected across one of the isolator switches 16 or 17 as a part of one of the lines 6 or 7 respectively. In this way one of these lines will comprise three stations.

During reconnection of more than two stations, it must be decided beforehand in which order the different stations are to be deblocked. As previously mentioned, the first station during the deblocking will take up none or only a little current and then be ready to take up current when the next station is deblocked. This and all subsequent stations will as mentioned previously be deblocked without previous alteration in the voltage and current adjustment. If now in the deblocking of one of the subsequent stations the total of the current adjustments in all the connected rectifier stations is lower than the corresponding total for the inverter stations, the latter will reduce their voltage in order to obtain the desired current. At the same time the rectifier stations will reduce their voltage in order to avoid exceeding their existing currents. This process continues so that the line voltage becomes zero, that is, the complete transmission becomes voltageless.

If on the other hand the sum of the current adjustments of the rectifier stations becomes considerably greater than the existing sum of the currents of the inverter stations, the reconnected rectifier stations may interfere with the distribution of current and power in the original system in a way which is not permissible. It is therefore important that the deblocking sequence for more than two stations is chosen so that the actual sum of the currents of the rectifiers always exceeds the actual sum of the currents of the inverter stations by a reasonable amount.

We claim:

1. Method of operation of an HVDC transmission plant, said transmission plant comprising two separate transmission lines; converter stations connected to said transmission lines; each station being connected to an A.C. network; each station comprising control means for its voltage and current; switching means for alternative connection of each station to each of said transmission lines; and fault indicating means for each of said transmission lines; said method comprising the steps of first blocking, when a fault occurs in a line, the stations connected to line, then disconnecting such deblocked stations from said line, and then connecting such disconnected stations to the fault-free line; reducing in a first of said blocked stations the ideal no-load voltage to a value lower than the ideal no-load voltage of any of the stations connected to said fault-free line; then deblocking said first station, and thereafter deblocking other blocked stations one at a time.

2. In a method as claimed in claim 1, in which said first station is an inverter station, reducing the preset value of the current control of such first station to a low value.

3. HVDC transmission plant comprising two separate transmission lines, converter stations connected to said transmission lines; each station connected to an A.C. network and each station comprising control means for its voltage and current; and blocking means; switching means for alternative connection of each station to each of said transmission lines; fault indicating means for each of said transmission lines; a main control system for each line; the fault indicating means of each line being connected to said main control system, the main control system being connected to said blocking means and to said switching means in each station of the line; said main control means being connected in a first of said stations to the voltage control means of said first station to reduce the ideal no-load voltage of the station in response to actuation of said fault indicating means; means for deblocking the first station after said voltage reduction; and means for thereafter deblocking all the other stations of the faulty line.

4. HVDC transmission plant as claimed in claim 3, the ideal no-load voltage of said first deblocked station being reduced to a value below the voltage of the fault-free transmission line.

5. HVDC transmission plant as claimed in claim 3, said first deblocked station being an inverter station; current measuring means in said first deblocked station, the deblocking means of said next deblocked station being connected to said current measuring means; said deblocking means being responsive to a signal from said current measuring means.

6. HVDC transmission plant as claimed in claim 3, one of the transmission lines being connected to at least three stations, including inverter and rectifier stations, the deblocking sequence of said stations being predetermined in accordance with the momentary totals of the current settings in the rectifier stations and inverter stations respectively; said current total for the rectifier stations always exceeding the current total for the inverter stations.

7. HVDC transmission line as claimed in claim 3, in which said first station is an inverter station, said main control system being connected to the current control means of said first station to reduce the current setting of said station in response to the occurrence of a fault.

References Cited

UNITED STATES PATENTS 3,275,838    9/1966    Almstrom.

ROBERT K. SCHAEFER, Primary Examiner

H. J. HOHAUSER, Assistant Examiner

U.S. Cl. X.R.

317—22